Aug. 7, 1945.

H. F. HOBBS 2,381,593

POWER TRANSMISSION GEAR

Filed Nov. 3, 1941

Inventor:
H. F. Hobbs
By Young, Emery & Thompson
Attys.

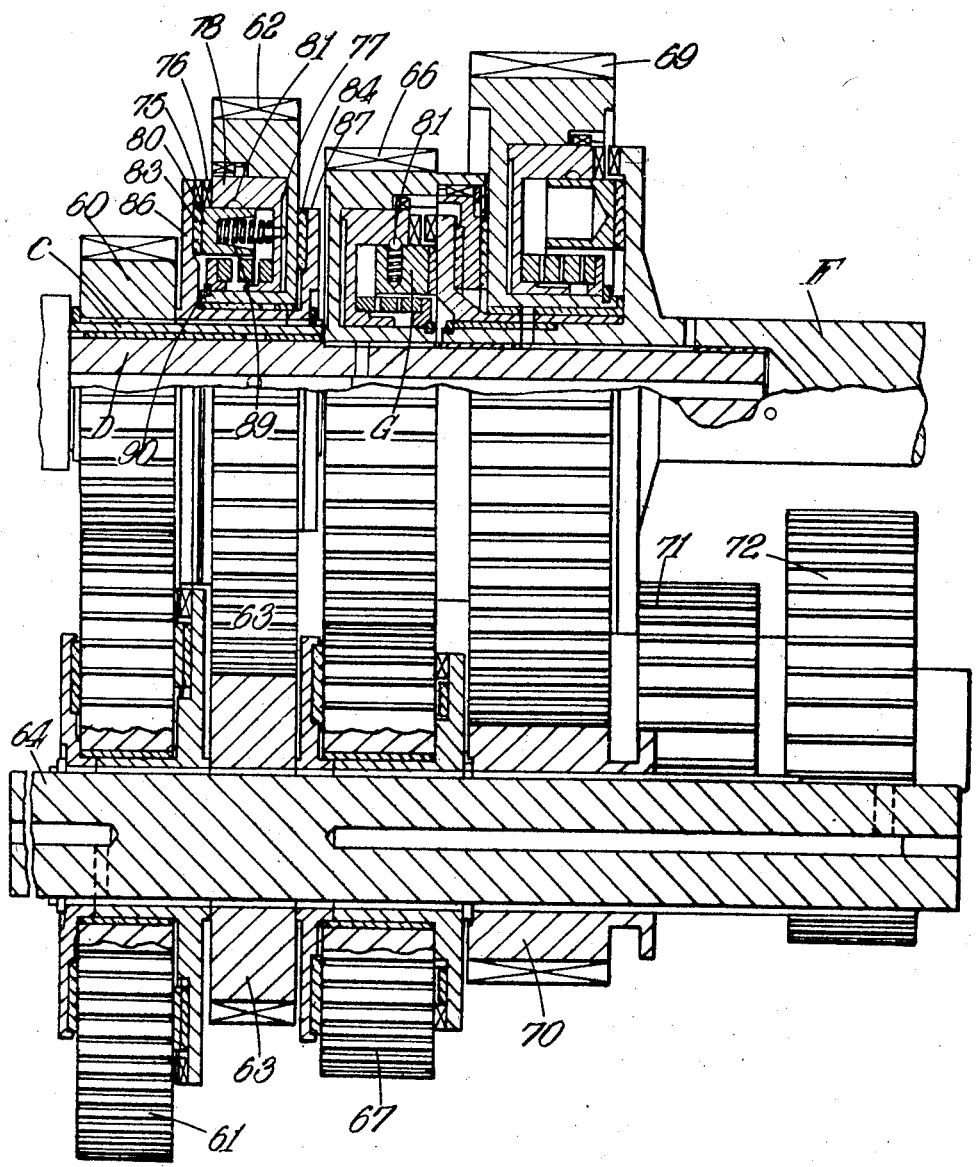

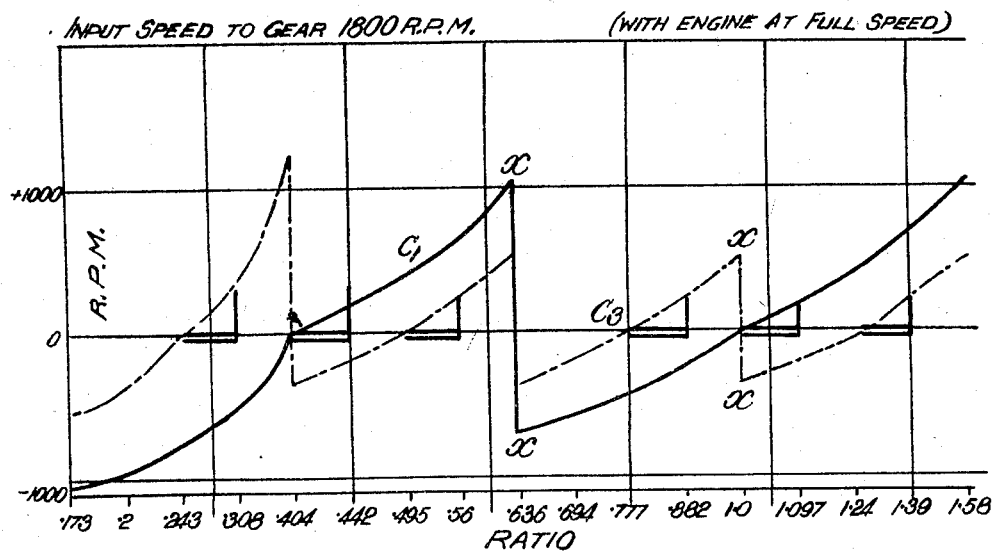

Aug. 7, 1945.    H. F. HOBBS    2,381,593
POWER TRANSMISSION GEAR
Filed Nov. 3, 1941    11 Sheets-Sheet 4
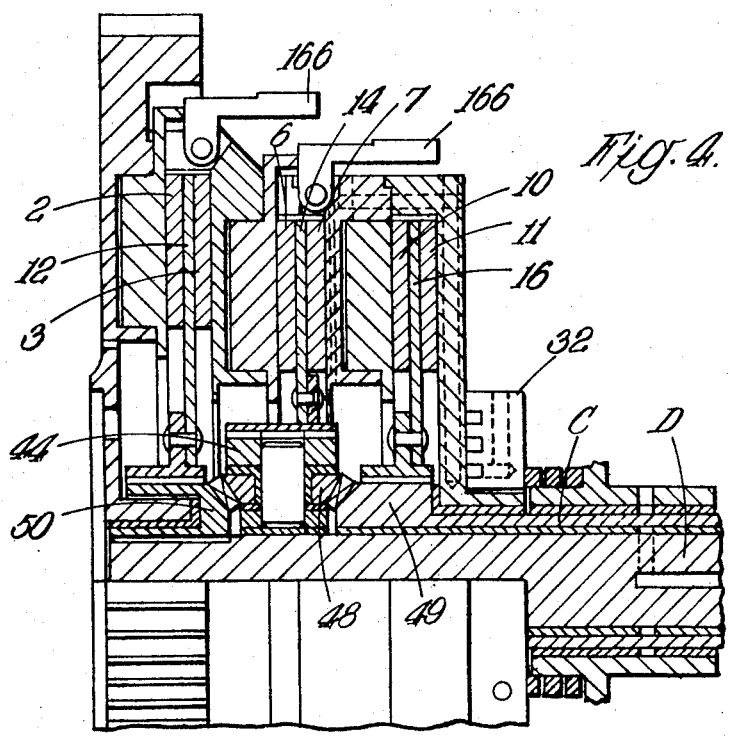
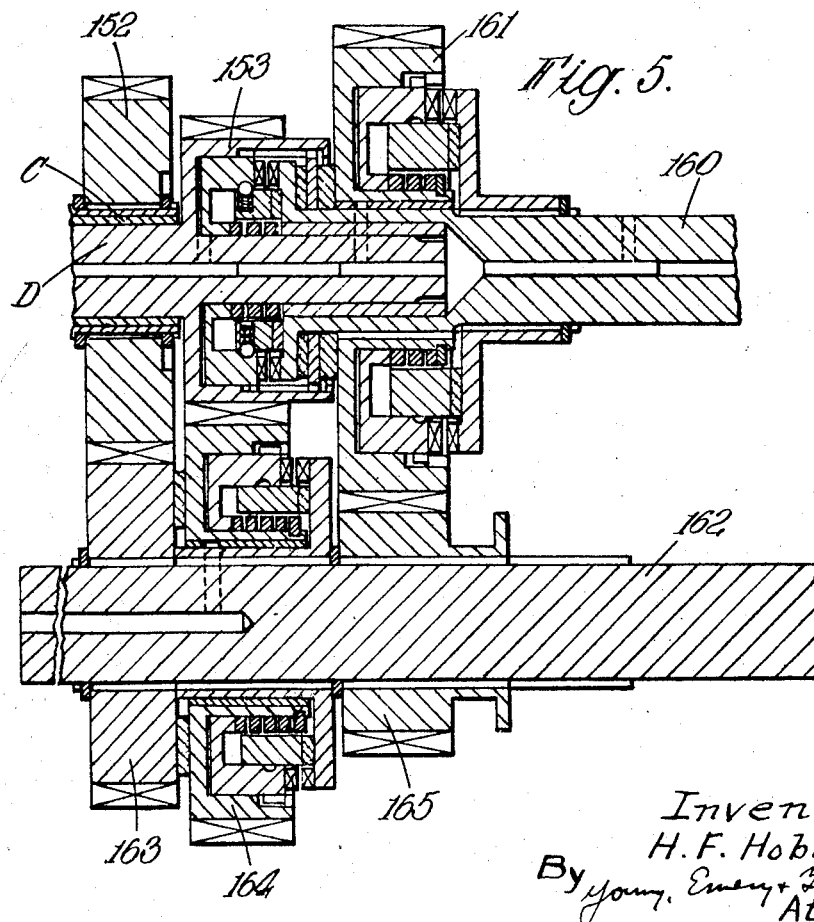
Inventor:
H. F. Hobbs
By Young, Emery & Thompson
Attys.

Aug. 7, 1945.     H. F. HOBBS     2,381,593
POWER TRANSMISSION GEAR
Filed Nov. 3, 1941     11 Sheets-Sheet 5

Inventor:
H. F. Hobbs
By Young, Emery & Thompson
Attys.

Aug. 7, 1945. H. F. HOBBS 2,381,593
POWER TRANSMISSION GEAR
Filed Nov. 3, 1941 11 Sheets-Sheet 6
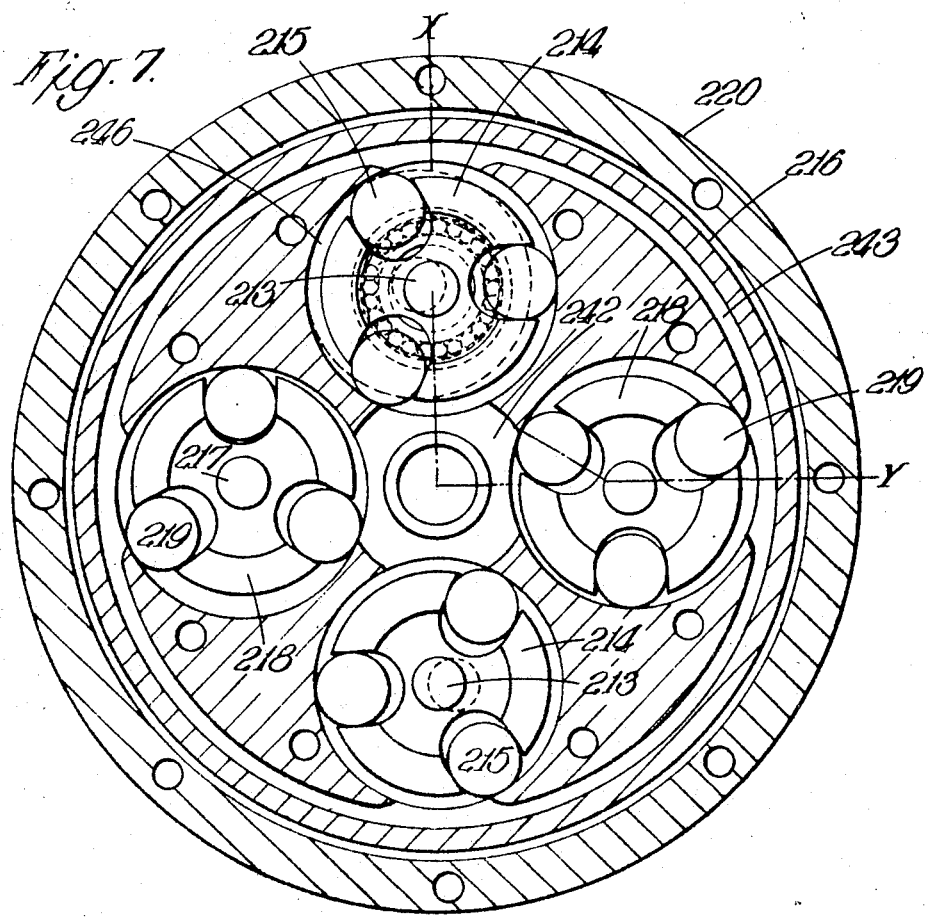
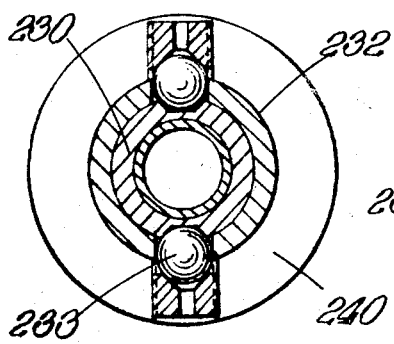
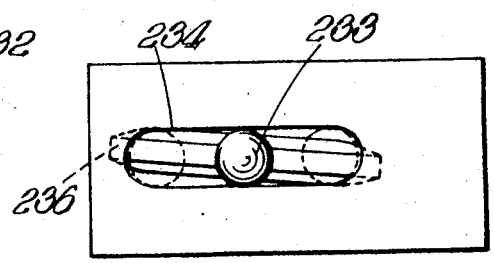
Inventor:
H. F. Hobbs
By Young, Emery & Thompson
Attys.

Aug. 7, 1945.  H. F. HOBBS  2,381,593
POWER TRANSMISSION GEAR
Filed Nov. 3, 1941  11 Sheets-Sheet 7

Inventor:
H. F. Hobbs
By Young, Emery & Thompson
Attys.

Aug. 7, 1945.  H. F. HOBBS  2,381,593
POWER TRANSMISSION GEAR
Filed Nov. 3, 1941  11 Sheets-Sheet 8
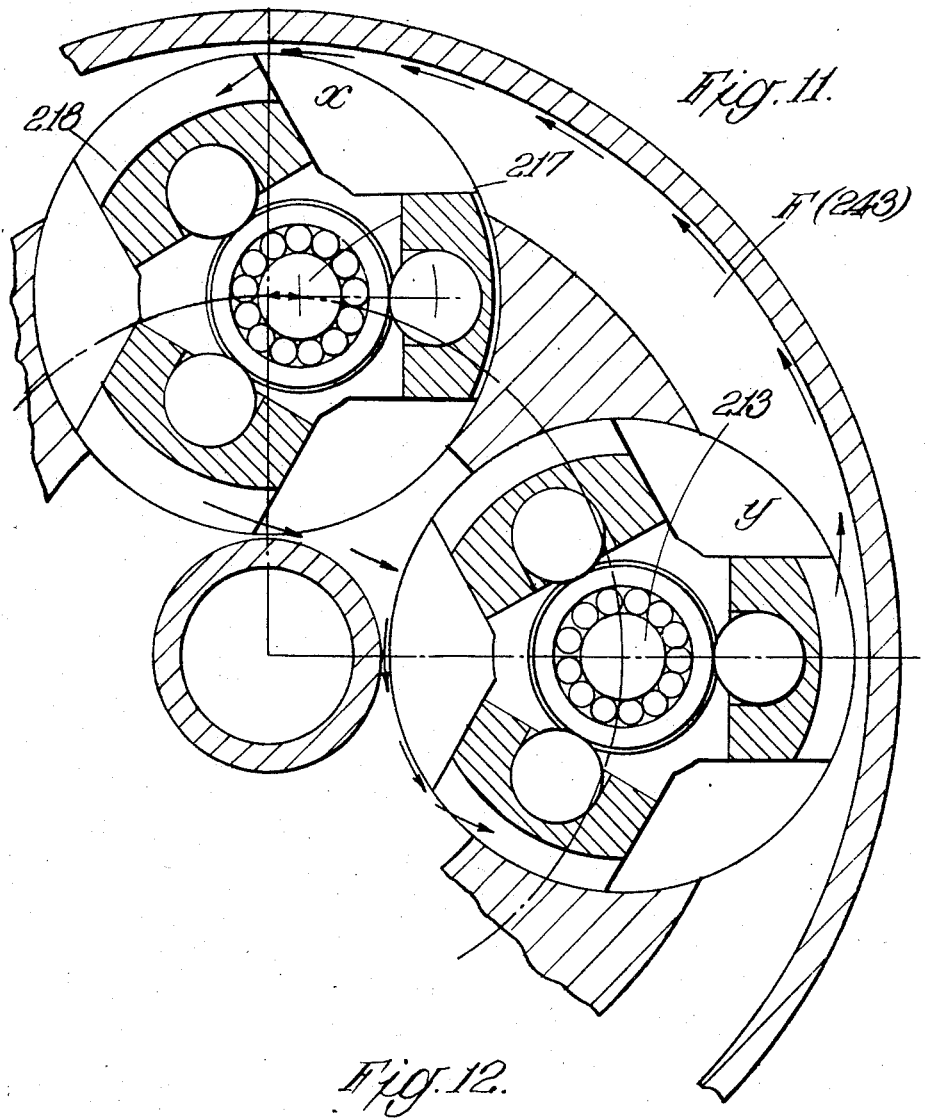
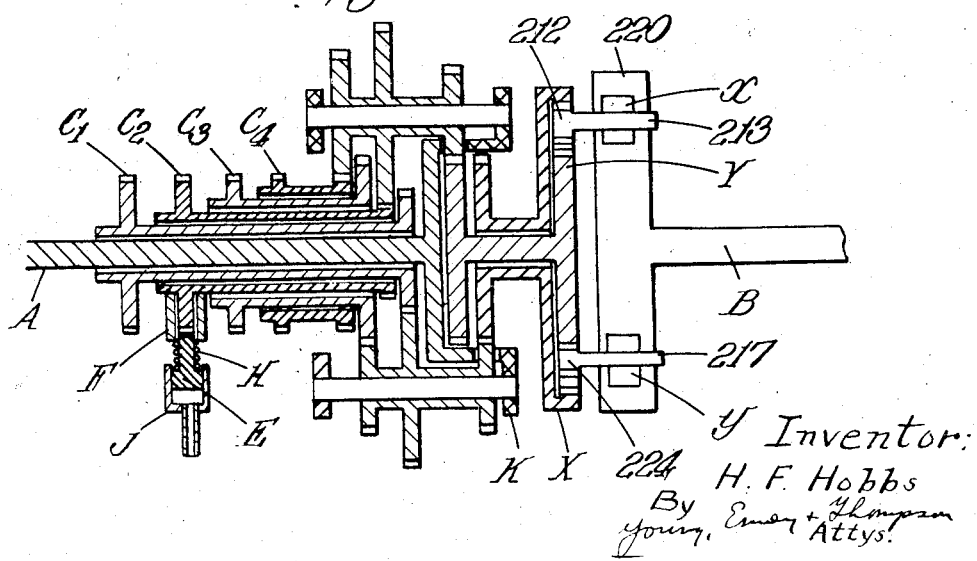
Inventor:
H. F. Hobbs
By Young, Emery + Thompson
Attys.

Aug. 7, 1945.  H. F. HOBBS  2,381,593
POWER TRANSMISSION GEAR
Filed Nov. 3, 1941    11 Sheets-Sheet 9
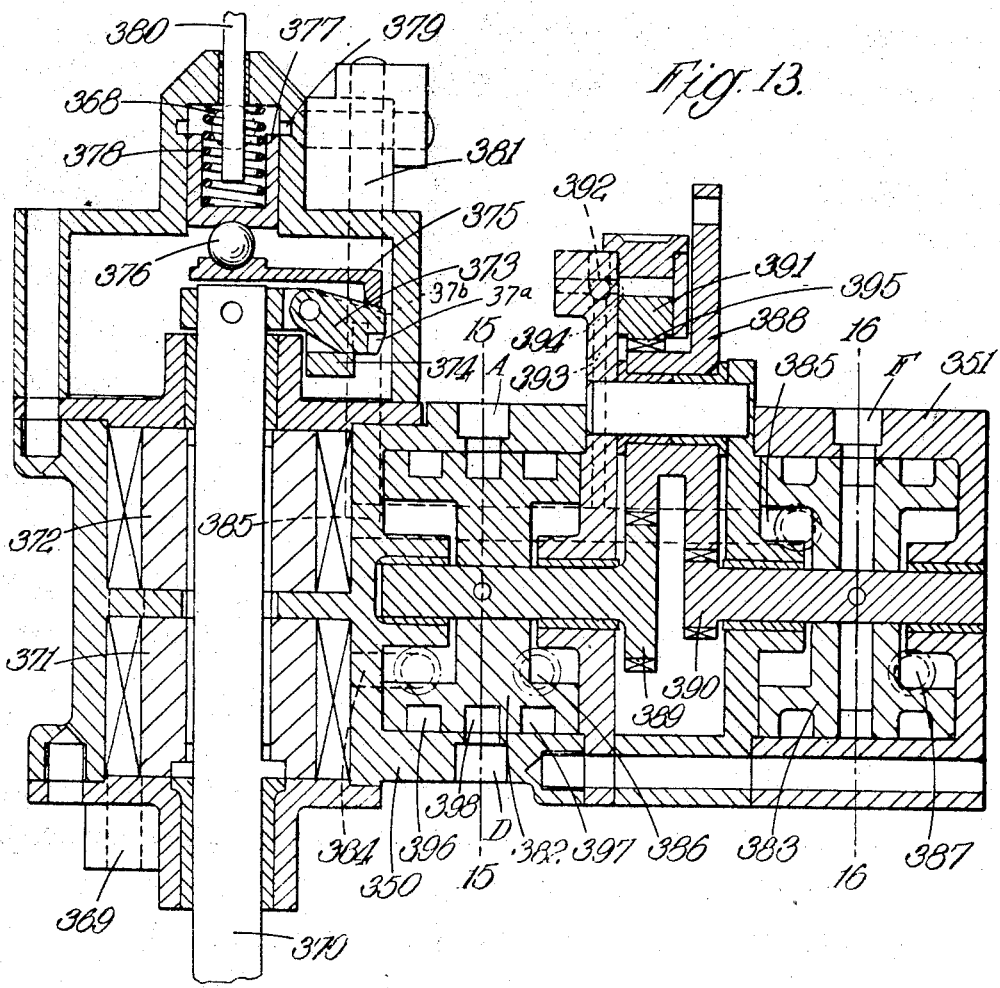
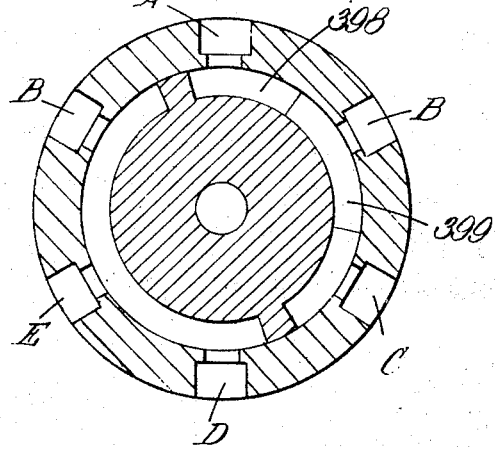
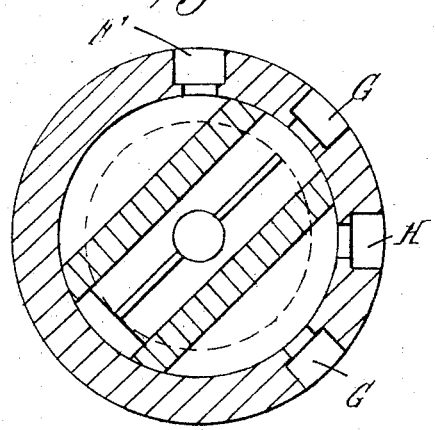
Inventor:
H. F. Hobbs
By Young, Emery & Thompson
Attys.

Aug. 7, 1945.  H. F. HOBBS  2,381,593
POWER TRANSMISSION GEAR
Filed Nov. 3, 1941   11 Sheets-Sheet 10
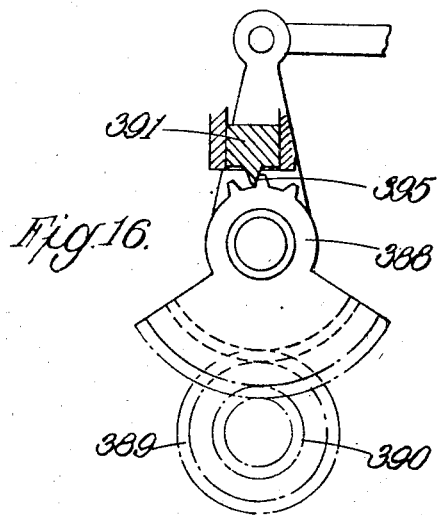
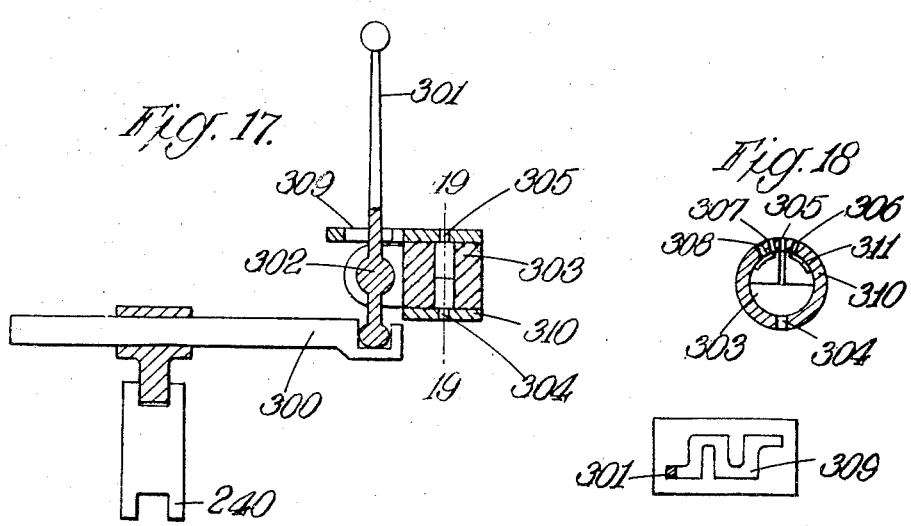
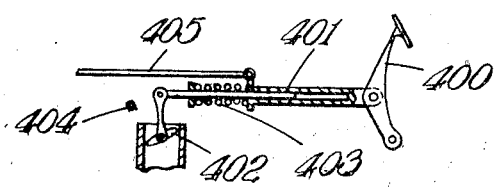
Inventor:
H. F. Hobbs
By Young, Emery & Thompson
Attys.

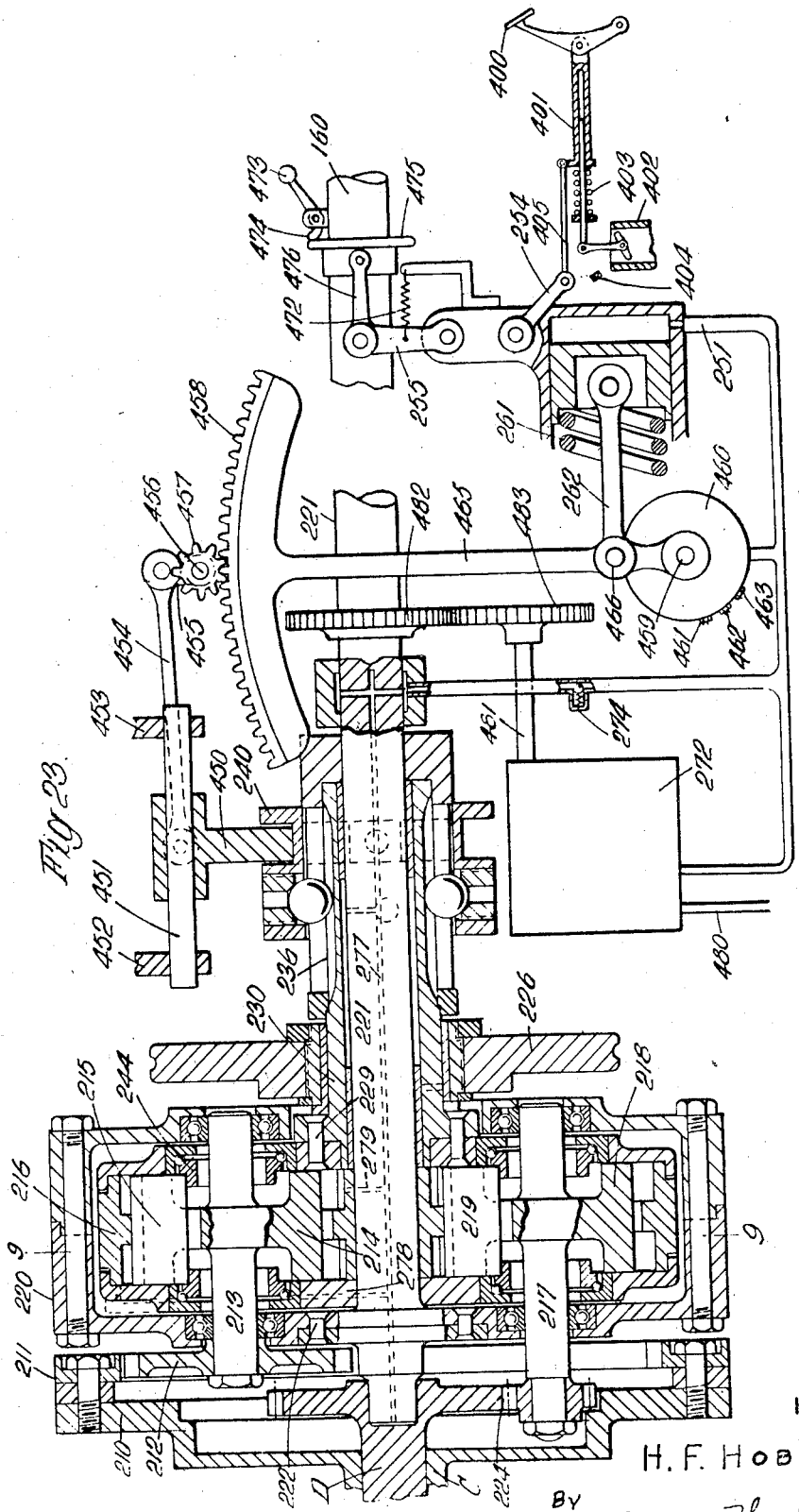

Patented Aug. 7, 1945

2,381,593

UNITED STATES PATENT OFFICE 2,381,593

POWER TRANSMISSION GEAR

Howard Frederick Hobbs, Leamington Spa, England, assignor of one-half to Charles James Prior Ball, London, England Application November 3, 1941, Serial No. 417,739
In Great Britain November 13, 1940

24 Claims. (Cl. 74—472)

This invention relates to power transmission apparatus.

The normal layshaft type of gear has the advantage of high transmission efficiency through the gear teeth and simplicity of construction with few ratios, but has the great disadvantage of low overall efficiency with few ratios, difficulty of effecting gear change since this involves breaking the transmission whilst the change is made, and difficulty of providing four or more gear ratios which are very desirable in many applications such as motor-cars, aircraft superchargers and winches and in fact essential for some applications such as large armoured track laying vehicles. The use of epicyclic type of gears having friction brake bands has some advantages but again provides very large and heavy gears and since each friction brake must carry the reaction torque of the associated ratio high pressure and a large friction area is involved and considerable difficulty is involved in increasing the number of ratios in such a gear. Control (gearchanging) of layshaft and epicyclic gears also presents difficulties particularly if sufficient ratios are to be provided. Fluid and electrical transmission gears have also some advantages for providing sufficient ratios and ease of control but again are large and heavy and usually less efficient than toothed gears.

Infinitely variable gears are theoretically advantageous from the overall efficiency and control point of view but the size of gear is considerable and in practice the variation will almost certainly be effected in steps so that the gear becomes merely a stepped gear with a sufficiently large number of changes to avoid noticeable shock on changing gear.

The present invention can provide toothed or equivalent mechanical drive in all ratios with a direct drive if required and enables a large number of ratios to be employed with very little complication and corresponding low weight and size. The invention also enables gear change to be accomplished without breaking transmission and the parts being coupled and uncoupled are under no load or very little load, and certain considerable parts of the transmission carry only low torque and can therefore be made small and light. Ease of control can be ensured without undue complication.

The invention comprises a power transmission apparatus comprising a gear-box giving at least two fixed torque speed ratios and having at least two input or two output shafts both coupled simultaneously to a distributor in such a manner that both of these shafts can transmit power simultaneously, the distributor being adapted to distribute the transmitted torque between the two shafts and to cause all the power to pass through one of the shafts when the next gear ratio can be coupled to the other idle running shaft then to divide the torque between the two shafts, which transmit power simultaneously, and thereafter to cause all the power to pass through the other shaft, and so on if more than two fixed ratios are provided.

The distributor may be of a mechanical type having differential gearing for dividing the power between the two shafts, or may be a fluid or other type of gear.

In most applications three or more ratios will be provided in the gear-box (which is preferably a layshaft gear) and the distributor causes the power to be transmitted by one shaft with the second input shaft running free; the distributor gear then passes some power to the second shaft and both shafts then transmit power; power is subsequently transmitted solely through the second shaft and at this period the gear ratio of the first shaft (now under no load) is changed whereafter the same parts of the distributor gear are used again in the reverse order to transmit some power to the first shaft and then full power to the first shaft whereupon a ratio change of the second shaft gearing (now under no load) can be effected.

The following advantages may be noted:

(1) The ratios of the gear can be changed throughout the whole range without any interruption in the power transmission.

(2) The same elements of the distributor can be used between any number of fixed ratios in the gear-box and whilst providing a large number of overall torque/speed ratios will itself handle only input torque and is consequently light in weight and small in size.

(3) The distributor transmits most of the power directly and loss of efficiency is therefore only a percentage of the small amount of the power which it transmits within itself and not the same percentage of the total power transmitted. Thus for example a 10% normal efficiency loss in a gear-box would be doubled (i. e., 20%) if the gear-box were duplicated to give the required further ratios but in the present invention the 10% loss would be increased by only 10% or 5% (if the distributor transmits only 5% of the power within itself) giving a total loss of 10.5% as compared with the above mentioned 20%.

(4) The gear may be arranged to provide a very large number of torque speed ratios which may be so close together that changing can be effected without noticeable speed changes and involving much less weight and complication than would be involved by providing additional normal gear trains.

(5) Friction clutches can be used in the distributor as torque on the clutches is very low and the clutches therefore can be small and efficiency losses due to slip in changing from one ratio to another will also be small.

(6) Hydraulic or electric power transmission can be avoided and the total gear is no larger and may be smaller than the mechanical gears which are normally combined with hydraulic or electric units.

(7) The number of parts that have to carry full torque is reduced to a minimum and even these for considerable periods carry much less than full torque as the torque is divided, for example between two gear trains, and size and weight of parts is correspondingly reduced.

(8) For heavy application (e. g., heavy armoured track vehicles) the required wide range of ratios and high power transmission can be effected with a gear small enough to enable two gears to be used one on each track for steering, and steering and gear change can be effected from a single control element.

Construction forms of the invention will now be described by way of example with reference to the accompanying diagrammatic drawings in which Figure 1 is a vertical longitudinal sectional view of a gear-box suitable for the present invention;

Figure 2 is a similar view of a distributor made in accordance with the invention;

Figure 3 shows curves of relative speeds in the distributor friction clutches and indicates the parts of these curves over which speed change is effected;

Figures 4 and 5 are similar views of modified forms of a distributor and a gear-box respectively;

Figure 7 is a transverse sectional view of a fluid type distributor;

Figure 9 is a sectional view on line 9—9 on Figure 8;

Figure 10 is a detail view to be described;

Figure 11 is a part view similar to Figure 7 and showing a modification of the arrangement of Figure 7;

Figure 12 is a longitudinal vertical sectional view of another form of gear-box coupled with the fluid type distributor;

Figure 13 is a vertical section view of a control mechanism for use with a clutch type distributor;

Figure 14 is a section on line 15—15 on Figure 13;

Figure 15 is a section on line 16—16 on Figure 13;

Figure 16 is an end view partly in section of a detail of Figure 13;

Figure 17 illustrates another form of control suitable for use with a fluid type distributor;

Figure 18 is a section on line 18—18 on Figure 17;

Figure 19 is a top view of a detail of Figure 17;

Figure 22 illustrates a detail to be described, and

Figure 23 is a combined view of Figures 8, 21, and 22.

Figure 6:
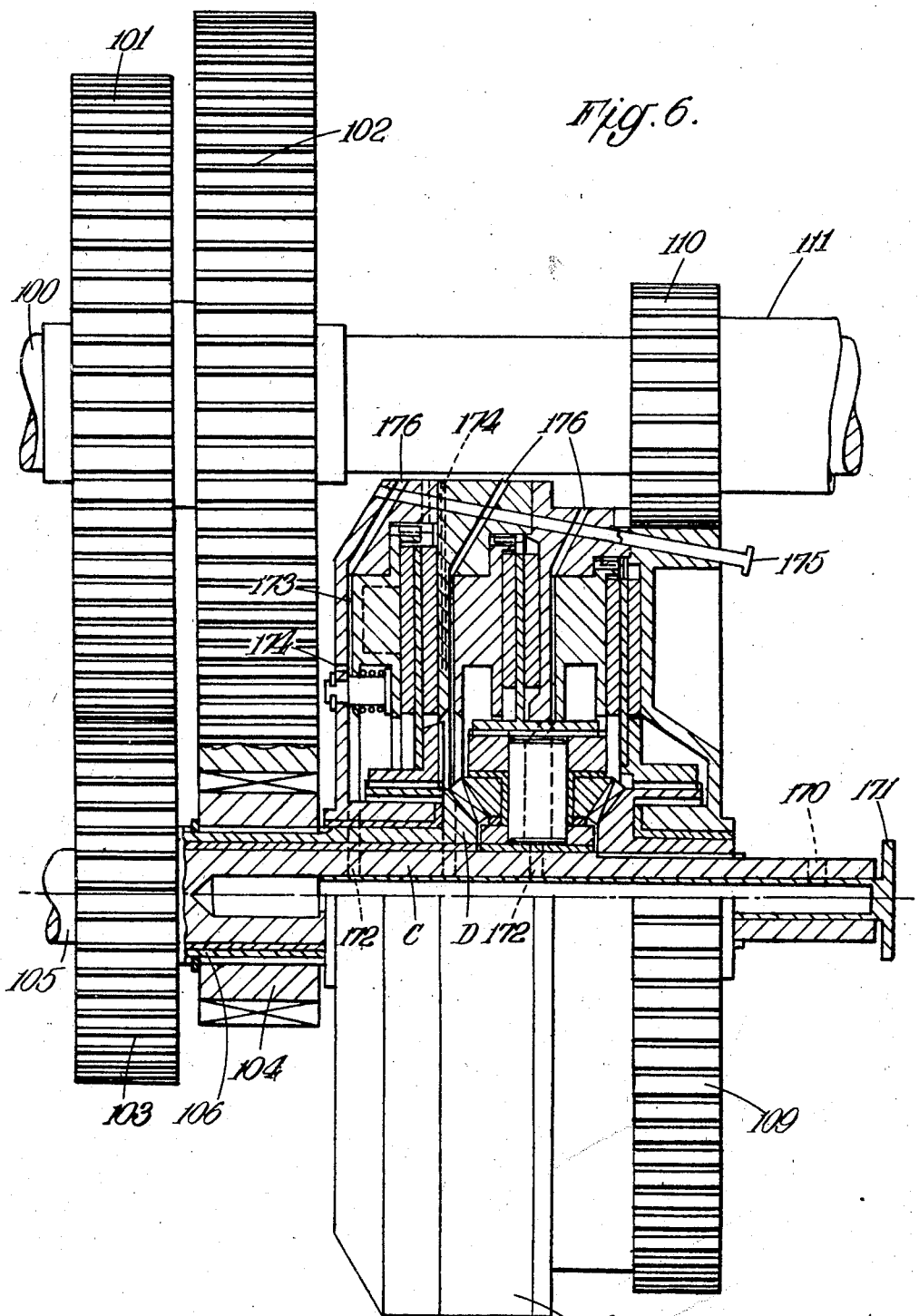
Figure 6 is a similar view of a modified gear-box coupled with a distributor and adapted for special applications.

The input shaft A drives the distributor shown in Figure 1 which can distribute the power according to five different ratios to the two output shafts C, D (C being a sleeve surrounding D), but the distributor can be reversed so that the shaft A is used as the output shaft.

The shaft A drives the distributor casing 1 which carries five pairs of friction clutch rings 2, 3; 4, 5; 6, 7; 8, 9; and 10, 11. Five corresponding friction plates 12, 13, 14, 15, and 16, are disposed one between each pair of clutch rings. The clutch rings 3, 5, 7, 9, and 11, are carried respectively by pressure rings 20, 21, 22, 23, and 24, that are carried by the casing 1 in an axially slidable manner and can be actuated by low pressure of fluid for gripping the clutch plates. For this purpose the five pressure rings are associated with five conduits for fluid and one of these is shown comprising ducts 27, 28, 29, 30, in the casing, annular port 31 in a ring 32 which is pressed against the casing by a spring 33, and duct 34. The ring 32 has five annular ports such as 31 and five ducts (or sets of ducts) such as 34 and the latter communicate with a pump through a control valve not shown in Figure 1. The clutch surfaces can be separated when not in use by springs of which one (36) is shown carried on a bolt 37. The fluid acts between the pressure rings and partition walls 40 carried by the casing.

The clutch plates 12 and 16 are fixed respectively to shafts D and C. Clutch plates 13 and 15 are carried respectively by the bevel gear wheels 42, 43, of a differential gearing the pinion housing 44 of which carries the clutch plate 14. The differential housing carries the pinion 45 which gears with wheels 42, 43, and has another pinion 48 fixed to the pinion 45 and gearing with bevel gear wheels 49, 50, of the differential gearing. The wheels 49, 50, are mounted respectively on the shafts C and D.

The distributor can thus divide the power in the following five ways:

1. Clutch 16 is engaged and the others disengaged. All power passes through the shaft C except for any transmission through D due to friction.

2. Clutch 15 only is engaged. Transmission occurs through 43, 45, 44, 48, 49, 50, to drive the shafts C and D differentially with more torque transmitted to C than to D.

3. Clutch 14 only engaged. Transmission occurs through 44, 48, 49, 50, to drive the shafts C and D differentially with half the torque going to each.

4. Clutch 13 only engaged. Transmission occurs through 42, 45, 48, 49, 50, with more torque passing to D than to C.

5. Clutch 12 only engaged. Transmission of all power to shaft D.

These five methods of distribution are applied between each two adjacent ratios in the gear-box.

The distributor has no reaction on a fixed member except the reaction of the gearbox and therefore the sum of the torques on the shafts C and D will at all times be exactly equal to the torque on the distributor input shaft A except for differences arising from friction, or air resistance, or acceleration.

One example of a suitable gear-box is shown in Figure 2 in which the shafts C and D are continuations of the shafts C and D in Figure 1.

The shaft or sleeve C carries a gear wheel 60 that gears with a toothed wheel 61 that is carried loosely on a layshaft 64 but can be clutched to the layshaft. The shaft C also loosely carries a gear wheel 62 that can be clutched to it and which is in mesh with a toothed wheel 63 fixed to the layshaft 64.

The shaft D carries a fixed gear wheel 66 that can be clutched to the output shaft and also meshes with a toothed wheel 67 that can be clutched to the layshaft. A gear wheel 69 is loosely carried by the output shaft and can be clutched to the output shaft and also meshes with a toothed wheel 70 slidably attached to the layshaft. A reversing gear 71, 72, is slidably mounted on a separate shaft and is brought into operation by disengaging 70 from 69 and engaging 71 with 69 and 72 with 70. A neutral condition is obtained by sliding gear 70 out of mesh with 69.

The clutching of the wheels 61, 62, 66, 67 and 69, is effected in all cases by generally similar means comprising one element 75 of a dog clutch fixed to the shaft and the corresponding dog clutch element 76 carried by a ring 78 axially slidable in the wheel. The ring 78 carries an axially displaceable synchromesh ring 80 the two rings being normally held against relative displacement by a spring pressed ball 81. Fluid under low pressure (e. g., 40 lbs. per square inch) is introduced to a space 77 and presses the rings 78 and 80 on the one hand and the wheel on the other hand in opposite directions against friction rings 83, 84, respectively, which tend to synchronize the speed of the wheel with that of parts 86, 87, that are fixed to the shaft. As the pressure increases the ball 81 is repressed to allow the ring 78 to move so as to bring the dog clutch teeth 76 into engagement with the teeth 75. Springs 89, 90, restore the parts to their normal positions when pressure is released. The pressure is distributed from the same valve that distributes fluid to the conduits 34 of the distributor gear. Any small leak of oil can be carried away by suitable passages.

The clutch engaging loads are wholly self-contained. The clutch teeth may have an appreciable angle for easy engagement and to give slip if overloaded, also to ensure that the clutches will be self-disengaging on release of the end pressure.

The ratios are obtained as follows:

With clutch 16 of the distributor engaged all power is passed through the shaft C. With 62 free and 61 and 69 clutched a drive to the output shaft ensues through 60, 61, 64, 70, and 69. The gear 67 is also clutched to the layshaft but the shaft D runs free in the distributor. The distributor clutch 15 is now engaged and 16 disengaged whereupon some power passes as before to the output shaft through C, 60, 61, 64, 70, 69, and some power passes also through D, 66, 67, 64, 70 and 69 to the output shaft.

The distributor clutches 14, 13, 12, are engaged successively without altering the gear-box. When 12 is engaged all power passes through D 66, 67, 64, 70, and 69 leaving the shaft C under no load whereupon gear 62 is clutched to the shaft C and 61 is declutched. The distributor clutches 13, 14, 15, 16, are then successively engaged whereby full power is again brought on to the shaft C leaving D under no load and at this time 66 on shaft D is clutched to the output shaft, and 67 is released. The distributor clutches are again progressively brought into action until when 12 is again engaged all power passes through D and direct solid drive ensues. At this time the gears 62, 66, 67, are clutched to their respective shafts and 69 is released and then the distributor system is again used producing an overdrive which is finally at its maximum when 16 is engaged and all power is transmitted through C, 62, 63, 64, 67, and 66. Thus there are seventeen different overall ratios.

Engine R. P. M. may fluctuate only some 2 or 3% up and down through changes in torque ratio thus giving the equivalent of a continuously variable gear.

It can be seen from the example illustrated by Figure 3 that the mean speed difference in the distributor clutches during the engaging operation is very low, e. g., 100 R. P. M. when input to the unit is 1800 R. P. M. The mean slip power in the clutches is therefore about 5.5% of the total and to transmit say 200 horse power the mean slip power to a clutch during the small interval of time when making a change is only eleven horse power. The total number of changes is divided between a number of clutches each of which may be capable of absorbing some 150 horse power. The lines $x-x$ show speed change when the gear-box ratio is changed. The speed difference in the clutches during engagement is shown by the portions of the curves adjacent to the approximately triangular parts.

The efficiency of the gear is practically the same as that of the gear-box.

Power transmitted within the distributor is given by the equation:

$$P = \frac{(R_x - R)(R - R_y)}{R(R_x - R_y)}$$

in which $P$ = proportion of total power
$R$ = overall ratio
$R_x$ = one gear-box ratio
$R_y$ = the other gear-box ratio.

Thus when the overall ratio is 0.7775

$R = 0.7775$
$R_x = 1.0$
$R_y = 0.636$
$P = 0.107$ and the maximum power handle within the distributor (when the total is 200 horse power) is 21.5 horse power. Therefore if efficiency loss in the distributor gearing is say 5% the loss in power is only a little over 0.5%.

Both weight and efficiency are much superior to, for example, two gear-boxes in series each transmitting the total power and together, giving a similarly large number of ratios. These advantages are additional to that resulting from being able to change the gear-box ratio without break in the transmission.

Even during change from one torque ratio to another, the mean slip loss only amounts to some 5%.

Therefore since the total power is transmitted through two pairs of gears only and there are only eight gears in all (for the forward speeds) to give the large number of ratios required, the arrangement provides maximum efficiency and minimum weight.

It should be appreciated that, because of the high and self-contained engaging loads which can be conveniently provided, rapid changing through a series of ratios is possible. The gear-box clutches may have teeth of suitable shape to cause rapid disengagement. Should the teeth not be wholly engaged on engagement of a distributor clutch they will not tend to slip but will engage because of the high engaging load and low power passing to the dog clutch to be engaged, e. g., about ¼ of the total. The synchronizing brakes can in fact conveniently be of such size as almost to carry this portion of the total power, thus permitting only sufficient slip to enable engagement of the dogs to be made. Thus, for example, large track speed differences in a "tank" can be brought about in a comparatively short time. Excessively large power circulation between the tracks can, if desired, cause slip in the dog clutches.

The two input shafts or other members may have considerable resilience if the distributor clutches are dog clutches or freewheels or other ratchet devices, e. g., dog clutches with ratchet teeth.

Because of the low torque and slip power to be handled by the clutches the solution is more satisfactory than would result from the addition of hydraulic or electric power transmitting means, for if changing gear sufficiently frequent for slip to take place over 25% of the total running average loss would not much exceed 1% and therefore much less than would result with electric or hydraulic transmission.

For certain applications the distributor may have more than the number of clutches indicated whilst in other applications only the clutches for transmitting the full power through each shaft alone and one differential will be required, an example of which is shown in Figure 4 in which the numerals correspond to those of Figure 1 for similar parts.

In this arrangement the clutch used for starting is made larger than the others which have much less work to do. If the gear is to rotate at fairly high speeds the springs to hold the clutches out of engagement are replaced by small bob-weights shown at 166. This avoids having springs to withstand the centrifugal pressure on the fluid sufficiently strong for maximum speeds and therefore excessively strong during low and normal speed running. It will be understood that without some means to hold the clutches disengaged, the centrifugal pressure on the fluid may cause the clutches to engage without fluid pressure being directed to the clutches.

The distributor may employ multi-plate clutches if it is desired to keep their diameter conveniently small.

The gear-box similarly may have any suitable number of gear changes. Figure 5 for example shows a layshaft gear-box in which the shafts C, D, each carry a single gear wheel 152, 153. The output shaft 160 carries the gear 161 and the layshaft 162 carries gears 163, 164, and 165. The gears 163, 164, mesh with 152, 153, and the gear 165 meshes with the output gear 161. Gears 153, 161 have clutches for clutching to the output shaft and 164 has a clutch for clutching to the layshaft. Seven speeds forward and three reverse are given with only six gear wheels in the gear-box plus reverse idlers, and there are only three gear-box clutches and three distributor clutches. The speed difference of all distributor clutches is zero in direct ratio if clutches on the gears 161, 164, are released. The clutch on 161 is normally released for direct and overdrive. If only two ratios are provided in the gear-box no clutches will be required in the gear-box and such an arrangement is shown in Figure 6, which is suitable for an aircraft supercharger drive and in which the shafts C and D are input shafts of the distributor. The engine shaft 100 carries two gears 101, 102, in mesh with gear wheels 103, 104, so as to provide two primary step up ratios. The gears 103, 104, are respectively carried on concentric shafts 105, 106, connected to the distributor the rotary casing 108 of which is provided with a toothed ring 109 which drives a pinion 110, on the blower sleeve 111 thereby providing a final step up gear. The sleeve 111 is rotatably mounted on the engine shaft 100. The distributor is thus in effect mounted on a layshaft comprising the shafts 105, 106, which run at high speeds because of the primary step up ratios and therefore torque is low and the distributor clutches small and light. The distributor is shown with three clutches. In this arrangement the distributor unit rotates at high speed of say 6000 to 8000 R. P. M. The centrifugal force on the fluid operating the clutches is therefore used to operate the clutches. The fluid is led through a hole 170, the control valve 171 directing the fluid in turn through holes 172. The fluid will reach a cavity such as 173 and will fill it and then overflow through a hole 174. The centrifugal pressure on the fluid will be ample to apply the clutch and for the size shown will transmit more than 300 B. H. P. The valve 175 may be interconnected to valve 171 so as to exhaust the cavity when required to disengage the clutch through a hole 176 or it may adjust a leak from the cavities so that the fluid will leak away when the feed to any cavity ceases and valve 175 would not then be required to be controlled during running. The clutches in the distributor vary in size as the highest speed requires much greater power to be transmitted than the lower speeds owing to the higher blower speed and greater boost.

In Figures 7 to 10 another form of distributor is shown which consists of a fluid type gear.

The distributor may be other than of the mechanical type. For example, a fluid type distributor as shown in Figures 7 to 11 may be used. The engine flywheel 210 carries an internally toothed ring 211 that drives two pinions 212 which are mounted one on each of the two spindles 213. The spindles 213 carry pump or motor wheels 214 having vanes in the form of rollers 215. These wheels are located within a drum 216. Two further pump or motor wheels 218 having vanes or rollers 219 are also provided within the drum. The wheel spindles are mounted in bearings carried by a housing 220 that encloses the drum 216 and is fixed on the output shaft 221 by rivets 222. The spindles 217 of the wheels 218 carry pinions 224 which if the gear were to be used simply as a fluid gear would be geared to a fixed reaction part but, as a distributor, will be coupled as hereinafter described with reference to Figure 12. The drum is fixed by rivets 229 to a sleeve 230 on the output shaft which extends through the gear and this sleeve is attached to the output shaft by means of a collar 232 fixed to the output shaft and carrying balls 233 and slots 234 that are parallel to the axis of the gear and which balls engage in slots 236 in the sleeve 230, the latter slots being inclined to the slots 234 so that axial displacement of the balls by means of a sliding collar 240 effects relative rotary displacement of the sleeve 230 and output shaft 221 and consequently also of the drum 216 on the one hand and said housing 220 and spindles 213, 217, on the other, whereby variation is effected from the concentric relation of the wheels and the bearing races 44 up to the maximum degree of eccentricity between them thereby varying the throw of the vanes of the output capacity of the pump and reaction wheels. The pump and reaction wheels may be of similar construction comprising a thick ring carried by the spindle and having slots 245 containing slidable vanes in the form of the rollers 213, 219 that contact or nearly contact with the walls 246 of the circular chambers formed in the drum 216 and which chambers are in communication through a central chamber 242 and an outer chamber 243. The rollers also project axially through the ring and seat upon circular races 244 mounted on suitable bearings and concentric with the said circular parts of the chambers. The arrangement is such that when the wheels 214 are at zero capacity, i. e. concentric with the circular chambers in the drum 216 the wheels 218 are at large capacity so that when adjustment by moving the collar 240 is made, the wheels 214 move away from their concentric dispositions whilst the reaction wheels move towards their concentric dispositions, whereby variation is effected simultaneously in opposite senses.

Replenishment of oil lubrication is effected by a pump 272 that passes oil through a pipe 273 and channels 277, 278, 279, into the gear.

A blow-off valve 274 is provided and set to ensure sufficient pressure against the exposed surfaces of the rollers 215 to overcome any centrifugal action thereon and so prevents rubbing contact with the drum 216. The channels 278, 279 are provided with non-return valves, not shown.

Figure 11 shows a modification in which piston type units are employed and spindles 217, 213 are moved to effect adjustment. As shown one of the pump or motor wheels (218) is at large capacity and the other is at zero capacity.

When the one set of wheels (214 or 218) are at zero capacity they can revolve freely. The other set are at large capacity and are prevented from rotation by the fluid. If for example wheels 214 are now set to deliver fluid this is passed to the chamber 43 and this also to the wheels 218 causing them to rotate. The wheels 214 draw fluid from the chamber 42 and the wheels 218 exhaust into this chamber.

When one set of wheels (214 or 218) are at zero capacity they can revolve freely. If the pumps are now set to deliver fluid this is passed to the reaction wheels or motors causing them to rotate. The fluid circulates in an unbroken band through 242, 243. The combined torques of both pumps and motors now act on the output part. When the capacity of the pumps and motors are equal the ratio of output to input speed is 0.5 and seeing that the torque is made up of both motor and pump torque, the power transmitted through the pumps and motors is only 0.5 of the total power. With further adjustment of the relative capacities the wheels 218 cease to receive fluid as they become of zero capacity. The wheels 214 which are now of relatively large capacity are held from rotation as the fluid cannot be displaced and the output speed equals the speed of the part 211. The input torque i. e., the torque driving the part 211 which is now equal to the output torque is transmitted directly and there is no power transmitted through the fluid, and no power transmitted to the wheels 218. The proportion of the total power transmitted by the hydraulic mechanism can therefore be expressed $N_1/N$ where N is the input speed and $N_1$ the output speed.

The total or overall efficiency will be greater than the efficiency of the hydraulic mechanism, for example when the ratio is 1.0, efficiency will approximate 1.0 (100%) seeing that there is no indirect movement or power transmitted. If the efficiency of the hydraulic gear is denoted $n$ the overall efficiency is $$N_1/N(1-n)+n \text{ and if } n \text{ is say } 0.75$$

then when—

| $N_1/N=0.25$ | $N_1/N=0.5$ | $N_1/N=0.75$ | $N_1/N=1.0$ | overall efficiency is

| 0.81 | 0.875 | 0.94 | 1.0 |

The arrangement enables centrifugal loads on the pumps and motors to counterbalance pressure loads and the gearing permits smaller hydraulic units. This further improves efficiency and brings weight and size, and therefore cost within comparative limits.

Because of the advantages of the continuous range of transmission ratios an inefficient hydraulic or electric gear may enable improvement in performance to be obtained of a road or rail vehicle for example as compared with that given by a stepped gear. Inefficiency, however, results in heat which in the case of the hydraulic gear tends to reduce viscosity and increase clearances which only add to the already difficult problem of providing a mechanism of sufficient size to handle the power without employing unsuitably high pressures and fine clearances.

It will be seen that when $N_1/N=$say 0.8 the proportion of the total power transmitted via the hydraulic gear is only 0.2 and if the required total range is only say 0.8–1.0 the gear could be small seeing that, for example, with a total input of 50 B. H. P. only 10 B. H. P. is handled by the hydraulic mechanism. It may also be observed that the range of speed of the hydraulic units on their own axes is dependent on the overall range required. Taking for example the wheels 214 and an input speed of 4000 R. P. M. when $N_1/N=0$, R. P. M. of the wheels 214 would be 4000 if pinion and sunwheel ratio is 1.0. When $N_1/N=0.8$ however, R. P. M. of pump units is 800 and if 0.8 is the limit of the range required, for the same maximum unit R. P. M. the pinion and sunwheel ratio $$\frac{P}{S}$$

will be 0.2 and the units may be of ⅕ the capacity to transmit the same maximum power. The maximum power to be transmitted may also be reduced from that equal to the total as in well known types to 0.2 of the total thus the hydraulic units can be reduced to 1/25 of the normal necessary capacity by the Hobbs arrangement when the range is limited to 0.8–1.0. Such large reduction in the necessary capacity eliminates those difficulties associated with known hydraulic transmission.

The use of the fluid gear as a distributor will now be described with reference to Figure 12 coupled to a gear-box which by way of example is shown as a planetary gear instead of a layshaft type.

In principle it consists of normal stepped gearing with ratios spaced over the required range combined with hydraulic gearing of simple form which operates over the intermediate ranges, the whole so arranged that the necessary coupling and uncoupling of the gear trains is accomplished while there is no torque load thereon and without break in the transmission of power.

The range of the hydraulic gear is utilised over each stage and the amount of power transmitted by the hydraulic gear is but a very small proportion of the total power and this gear is thus of comparatively small size and from the point of view of size, weight and cost comparable with a normal input clutch which becomes unnecessary.

The drum 220 is connected to the output shaft B and the rotors $x$, $y$, are driven through toothed gear trains from the input shaft A. The input shaft carries a cage K in which two (or multiples of two) spindles are mounted parallel to and offset from the axis of the gear. On the first of these spindles there is mounted a sleeve which carries three gear wheels the first of which is nearest the output end of the gear and meshes with a sunwheel carried by a rotary sleeve that carries an internally toothed annulus X which is the rotor 210 of Figure 8 and is in mesh with the pinion 212 on the spindle of the pump $x$. Rotatably mounted on the second spindle is a sleeve carrying another three gear wheels the first being nearest the output shaft and is geared to a sunwheel the spindle of which passes through the aforesaid rotary sleeve and carries a sunwheel Y with which a pinion on the spindle of the pump $y$ is in gear. The other gear wheels are geared to reaction members $C_1$, $C_2$, $C_3$, $C_4$, each of which can be brought to rest by means of a dog or pawl E that is normally held out of engagement by a spring and is pressed into engagement by fluid pressure entering a cylinder J and controlled by the same control member whereby the capacity of the pumps is varied. F is a brake which can be applied before inserting the dog. The gears XY can be driven at different speeds by the holding or releasing of reaction members $C_1$, $C_2$, etc. Assume $C_3$ and $C_4$ held. By varying the relative capacities of the hydraulic pumps $x$, $y$, B may be driven at any speed between that of X and Y. When $x$ is of zero capacity $y$ is relatively locked and B is driven at the speed of Y. $C_3$ can now be released it being inoperative and carrying no torque. $C_1$ can likewise be held driving X at increased speed. By varying the units $xy$, B can now be finally brought to the speed of X when $y$ becomes inoperative and $C_4$ can be released and $C_2$ held when by variation over the range again $x$ becomes again inoperative and if desired $C_1$ released and clutched to A when by variation of $xy$ B is driven at the speed of A. $C_2$ can then be released if considered desirable as $y$ is then inoperative. Speeds above the highest fixed condition and below the lowest are obtainable by variation of $xy$.

The fixed condition ratios provided may give speeds above, below or reverse in relation to the input. Any number of these fixed speeds may be provided. It is of course not essential to have the number shown. Y can be driven for example at a constantly fixed speed relative to A whilst X may be held stationary and then driven at the speed of A.

It will be observed that the same set of hydraulic units are used for all conditions there being never more than the one idle unit and the unit only being idle at certain given fixed points. Furthermore the relative speed differences of XY, B are reduced thus permitting high ratio gearing to the units $xy$. The total hydraulic capacity of the units is therefore greatly decreased. Thus both the proportion of the power transmitted via the fluid and the total necessary capacity is reduced not only removing the major difficulty of providing the hitherto necessary capacity but enabling the desired high efficiency to be readily obtained. Whilst the continuous range is available from the one control, the secondary gearing which may be other than the hydraulic type becomes a comparatively small part and in fact consistent with the reduction in the hydraulic or secondary power transmission and increased efficiency. To illustrate the operation by an example, assume the input speed is 4000 R. P. M. and two gear trains give output speeds of 1000 and 2000 R. P. M. One hydraulic gear sunwheel Y is thus driven at 1000 and the other X at 2000 R. P. M. If the hydraulic units $y$ geared to Y are set to displace fluid and those $x$ geared to X are set at zero capacity, units $y$ cannot rotate and the hydraulic drive is direct and the output shaft rotates at 1000 R. P. M. If $y$ is brought to zero capacity and $x$ set to displace fluid, $x$ cannot rotate and the hydraulic drive is direct and the output shaft rotates at 2000 R. P. M. Intermediate adjustment provides the intermediate speeds. It will be observed that when $x$ is fixed $y$ is free and its associated gear train similarly free. This train can therefore be released and another engaged which may drive Y at 3000 R. P. M. This operation can be performed with no interruption in the transmission of power which is passing via the sunwheel and unit X$x$. If the relative capacities of the units are again varied so that $x$ finally becomes of zero capacity and $y$ set to deliver fluid $y$ will again become locked and the hydraulic drive is again direct and the output speed 3000 R. P. M. $x$ is now free and its associated gear train which can be released and a direct connection made so as to drive X at 4000 R. P. M. The units can again be similarly varied producing an overall direct drive, when output speed is 4000 R. P. M.

The hydraulic gear can also be adjusted to give speeds above the highest fixed speed and below the lowest so that overdrive and neutral conditions are available. Reverse is provided hydraulically or more effectively by a gear train giving a reverse speed to X or Y.

At what may be termed the fixed points in the range where the overall ratio R is equal to one of the fixed gear ratios provided $R_x$ $R_y$, etc., the power transmitted by the hydraulic gear is zero and as will be shown is so small at other points as not to appreciably reduce the overall efficiency even though the hydraulic transmission be comparatively inefficient. The deficiencies of stepped gearing are thus overcome without the introduction of those associated with the hydraulic gear such as low efficiency and unsuitably large heat input to the fluid medium and the difficulties of the provision and operation of hydraulic units of sufficiently large capacity.

There are various arrangements which may be suitable for endless track vehicles and one arrangement may comprise a main gear unit with say a three speed gear to each track. Such a three speed gear may be arranged after the manner of Figure 6 in which case shaft 100 may take the final drive to the track sprocket, the rear axle input drive being taken on to the distributor unit casing (pinion 110 and its mating gear being replaced by the bevel drive from the main gear unit output shaft). In this arrangement the pressure for engaging the clutches would be applied in the same way as shown in Figure 1. Such an arrangement may avoid the changing of gear trains, the main gear having say a five speed distributor arrangement, the gear-box containing only say gears 60, 61, and 66, 67 (Figure 2) which remain permanently engaged. Either of the shafts carrying gears 103, 104, in the three speed gear may carry a brake or clutch acting from some fixed part, so as to hold the tracks stationary if desired. A gear such as is shown in Figures 1 and 2 may have a shaft from the engine passing straight through the centre, this shaft and the output shaft F each carrying sunwheels of a planetary gear, the double pinions of which are carried by a final output member. Variation of the gear may cause wider speed variation of the final output member, which may be caused to vary from a reverse to a forward running condition, thus permitting each track to be held stationary or reversed without the need for engaging reverse pinion such as 71, 72. In this construction the gear unit may carry higher torque but may cover a smaller speed range.

A valve control apparatus for controlling gear changes with a fluid type distributor is shown in Figures 13 to 16. A spindle 370 carries the driving gears 371 and 372 of two gear pumps, also spider 374 (one arm only shown) of the centrifugal governor comprising bob-weights 373, spider 375 and ball 376. Piston valve 377 seats on ball 376 and is held in position by spring 378. A rod 380 may be operated by manual control and the piston valve held in the open position against the action of the bob-weights. The bob-weights carry small projections 37a which contact with an abutment 37b on the spider 374 when fully outwards and the bob-weights directly seat in the spider when fully inwards. They are held inwards at low speed by gravity and spring 378. Spider 375 rotates but is free to adjust its position on ball 376, should the bob-weights take-up slightly different positions. Intake to the pumps is shown at 369 and outlets 384, 385. Relief valves (not shown) are provided in the outlets. Fluid under pressure is delivered to rotary valves 382, 383, from the pump outlets through drillings to the collector grooves 396, and thence by cut-away such as 399 to the distributor grooves 398. Grooves 397 are exhaust groves which exhaust through ports 386, 387. The valve 382 directs fluid to a gearbox such as shown in Figure 2 and the valve 383 to a distributor such as shown in Figure 4. The rotary valve 382 co-operates with a casing 350 which has outlet ports A, B, C, D, E, which communicate respectively with the five gearbox clutches and will require to be operated in the order ABE; BEC; ECD; and CDB. The rotary valve therefore leads pressure to ports A, B, and E together. Movement of the valve will first open A to exhaust and then C to pressure and so on and will thus be required to be rotated nearly half a revolution to cover the complete range. The valve 383 co-operates with a casing 351 having outlet ports F, G, H, leading to the three clutches respectively and required to apply the pressure to the distributor clutches in the order F, G, H, G, F, G, H, G, F. The rotor 383 is drilled from one side to the other so that after one half revolution is made pressure is again fed to the same ports, thus the nine engagements will be made on one revolution of the rotor. The rotor distributor port is arranged to simultaneously shut say port F and open port G, or overlap or lag can be provided according to the width of the distributor port in the rotor. A control lever 388 carries the gear segments engaging pinions 389, 390, which are of suitable size to cause the desired amount of rotation of each valve. The control member 388 also carries teeth 395 which engage a piston 391 in a cylinder which is connected to the pump delivery by drilling 393 which has a non-return valve 392. A leak 394 is provided in the valve seat. In operation at low engine R. P. M. the valve 377 allows the fluid delivered to the distributor control valve to exhaust through 368, 379 and 381. The distributor clutch is therefore not engaged although selected by the control until engine R. P. M. are such as to close the valve 377. When this valve is closed pressure is led to the clutch which is engaged by valve 383. Pressure is also led to the piston 391 so that when the control lever is moved to a position causing a change to be made in the gear-box, a tooth 395 prevents the control from rapid movement to a position causing a change of the distributor clutches, as the piston 391 must displace the fluid through the leak 394. Thus, the size of this leak can be arranged to cause sufficient delay to ensure that the new gear train is synchronized and engagement made before power can be applied to it, i. e. transmission must continue through the other engaged train. Such delay will of course be of but a fraction of a second duration. Further smaller teeth may be provided on control 388 or elsewhere on the control parts to position the valve at each torque ratio position.

The ports A, B, C, D, E, correspond for example to the clutches for the gear wheels 61, 67, 62, 66, and 69, respectively, in Figure 2, and clutches F, G, H, correspond respectively to clutches 16, 14, 12, shown in Figure 4.

Figures 17 to 19 show an apparatus for controlling gear change with a fluid type distributor. Control piece 240 of the hydraulic distributor may be operated by a lever 301 and a normal type selector rod 300 and thus moved backwards and forwards causing the hydraulic mechanism to vary over its range. The lever 301 is mounted on a rotary valve 303 which directs fluid at pressure from a pump and entering at port 304 to one of a number of ports 305, 306, 307, 308, which ports are connected to the gearbox clutches. The lever 301 may move in the gate arrangement 309 so that when it reaches the end of its movement either backwards or forwards it may be moved sideways thus rotating the valve and directing the pressure to another port 305, 306, etc., and exhausting the remainder through exhaust grooves 311.

To avoid providing a separate manual control for the gear changing the control mechanism can be operated by a control member which also controls engine throttle. Nevertheless, motor road vehicles for most effective use require variation of the engine throttle and of the gear transmission ratio to be under the control of the driver.

Development in recent years has been largely directed to ease of control of gear changing but in general the advantage has been at the expense of efficiency and ideal use of the power available, and the real problem is to provide ease of control accompanied by most effective and efficient use of the power available.

The normal motor car engine is roughly a constant torque engine with horse power variable over wide limits which is desirable and contrary to proposals to use constant power and constant speed engines and gears. Power must be available for acceleration and/or hill climbing at speeds up to maximum car speed. Maximum (or nearly maximum) acceleration and gradient performance can be provided by a gear which is either continuously variable or provides a sufficiently large number of torque speed ratios if this is arranged so that the engine employs maximum horse power continuously except at low car speeds where the horse power available must be restricted to avoid road wheel spin.

However, maximum performance is only required for a small percentage of the total period of operation and the horse power demand varies with the speed and acceleration desired by the driver and to a smaller extent with variation of gradient.

It can be shown that specific fuel consumption of an engine falls rapidly with increased throttle opening because of the increase of effective compression ratio. In other words, any required horse power can be generated far more efficiently on full throttle than at any less throttle opening and will involve lower engine speeds with consequent further saving of losses such as those due to exhaust oil churning and friction. For instance equal horse power might be developed at 1000 engine R. P. M. at full load (full throttle) as at 2650 R. P. M. with about one third full load using 0.65 and 0.85 respectively pints of fuel per horse power per hour. The 1000 R. P. M. could give say up to 40 M. P. H. with a gear operating on overdrive.

It follows therefore that maximum efficiency of an engine transmission gear unit is obtainable only by allowing the engine to work continuously under full load and varying the transmission ratio to produce the required variation of horse power. Thus when higher power is required for acceleration and/or hill climbing the driver should be able to select high engine speeds whereas when comparatively small power is required for example for level road running the driver should be able to select a suitably lower engine speed, the selection of these speeds being possible without necessarily varying throttle opening.

There are, however, some conditions under which the driver will prefer to run at part throttle opening and the control should permit this.

The invention therefore also comprises a control apparatus having a control member operable by the driver and associated with an engine transmission system arranged so that the driver by actuation of the control member can operate on any of a number of transmission ratios all being at full throttle of the engine, means to vary the transmission ratios according to throttle opening in the sense to obtain decreasing engine speeds or higher gear output speeds with increasing throttle opening, means being also provided to vary the transmission ratios according to gear output speeds in the sense of decreasing engine speeds or increasing gear output speeds with increasing gear output speeds, and serving also to predetermine the maximum and minimum engine speeds.

For example, all ratios may be obtainable for which the gear is capable between say 5:1 and 0.5 to 1 and at say 20 M. P. H. car speed the control member will be movable to provide any ratio between 4:1 and 0.5:1 all at full throttle whilst at 40 M. P. H. variations between about 2:1 and 0.5:1 only is required and obtainable again all at full throttle.

A single control member may be arranged to influence the ratio over the whole of its travel and the throttle over part of its travel only.

The control member, for example the accelerator pedal, will preferably perform the function of both ratio and throttle variation. The accelerator pedal may be moved downwards to increase performance and upwards to reduce speed or acceleration, the fully upwards position giving infinite ratio or neutral condition with the engine idling and the vehicle stationary.

One method for providing control is as follows:

An oil pump driven from the engine supplies fluid to a cylinder 250 through a pipe 251. Two rotary or piston valves 252, 253 are mounted in the cylinder head, the one (253) being connected to the pedal by way of a crank arm 254, the other (252) being connected by way of a crank arm 255 to a centrifugal governor driven from the output shaft. The interior of the valve 252 is connected to exhaust. The governor may be arranged in various ways; for example, the mechanism may be mounted on the output part of the gear, centrifugal force acting directly on a bob-weight attached to the arm 255. The governor controlled valve 252 has two exhaust openings 256, 257 and the pedal controlled valve 253 has an exhaust opening 258 in line with one of the exhaust openings (256) of the governor controlled valve 252 so that fluid from the cylinder 250 passing through the third opening (258) must also pass through the second opening (256) in order to escape to exhaust.

These valve openings permit fluid to leak from the cylinder at varying rates and thus vary the pressure within the cylinder. The cylinder may be fitted with a piston 260 held against the pressure by a spring 261, the piston thus taking up a given position for any given pressure. The piston is connected by way of piston rod 262 to the ratio control member, e. g., the member 300 shown in Figure 17 or with a stepped gear the piston 260 may be arranged to move in steps and the control ports provided in the piston 260 and cylinder 261.

The pedal valve 253 is so arranged as to gradually reduce the area of leak during the first half of the pedal travel and to gradually increase it during the second half. The first valve opening 257 is arranged to increase its area of leak with increase of output speed. The second valve opening 256 is arranged to restrict the leak from the pedal valve with increasing output speed.

The pedal is arranged to open the throttle over the first half of its travel, and to maintain the throttle fully open over the second half.

In operation:

With the engine idling and the pedal up, there will be sufficient leak from the pedal valve to allow the piston to remain in the infinite or neutral position. On part movement of the pedal, the throttle is part opened and the pedal valve leak restricted. This increases the pressure and moves the piston into a high ratio position, say 5:1. If the car increases in speed, which it will do unless on suitable gradient, the engine speed will increase also. This increases the supply of fluid from the pump, thus increasing the pressure in the cylinder and decreasing the transmission ratio.

Considering first the extreme conditions. If the pedal is moved to half travel, the throttle is opened fully and the pedal valve leak reduced to the minimum. The maximum pressures therefore exist which produce minimum transmission ratios. Engine R. P. M. increase rapidly as the road speed increases and suitable pressure and therefore ratios are given by suitable variation in the leak from the first valve opening, the governor valve being caused to move with variation in road speed.

If the pedal is moved to its full travel, leak from the pedal valve becomes a maximum and the engine therefore runs up to high speed before producing sufficient pump pressure to cause reduction in transmission ratio. Under this condition, however, the engine speed must remain substantially constant and the second valve therefore gradually restricts the leak through the pedal valve so as to cause the gradual reduction in ratio as car speed increases.

It will be apparent that the varying rates of leak will depend on the movement of the valves and on the construction and shape of the leak ports.

From the consideration of the maximum and minimum ratios, it will be evident that any intermediate ratio, with full engine throttle, is obtained at will and merely depends on the position of the pedal between the limits of half and full travel.

Pedal positions over the first half movement range provides varying conditions of part load or throttle running. This is best illustrated by example. Assume the car to be travelling at 40 M. P. H. with the pedal in half travel position and therefore with the engine at minimum R. P. M. and maximum overdrive transmission ratio, e. g., 0.5:1. If the pedal is moved towards the up position, pedal valve leak is increased and the throttle partially closed, the increase in leak causing lower pressure and a high transmission ratio, e. g., 0.9:1 ratio on about half engine load.

If the pedal is brought to the up position, the ratio tends to increase still further. It may be normally arranged for this to become no higher than 1:1 excepting at very low road speeds. It can be arranged, however, to provide a varying degree of engine braking. Thus, the throttle may close at some point before the pedal reaches the full up position, the positions intermediate giving various degrees of engine breaking. At 40 M. P. H. this might conveniently vary between say 1:1 and 1.4:1.

An additional hand control may be provided if desired to deal with variation in oil temperature, which can be provided by the addition of a hand controlled valve. Suitable arrangement, however, would not be greatly affected by variation in oil temperature. Hand control would be useful to provide more than normal engine braking for descending an unusually steep hill. Leak can be greatly increased by a hand valve whereby the ratio would become much higher than normal.

The above describes only one suitable method of providing the desired control. If, for example, a constant quantity of fluid is delivered to the cylinder irrespective of engine R. P. M., the pedal valve and output valve can be arranged differently.

If such additional hand controlled valve is provided, the crank arm 54 need move only over the throttle opening travel and the valve port controlled by this crank arm will be designed accordingly.

An arrangement may be provided for some applications in which the control valve will move rapidly over the intermediate positions and may open pressure to the clutch to be engaged slightly in advance to opening the previously engaged clutch to exhaust there being no period of total disengagement. The reverse action may take place when moving the control in the opposite direction, i. e., when changing to a high ratio.

Accelerator pedal and speed responsive control devices may be connected to the control lever 388 or in the case of control lever 301 may be provided with two pistons 60 one connected to move the lever backwards and forwards the other sideways and the gate 309 will be appropriately shaped. A spring may be provided in the connection for sideways movement.

As shown in Figure 22 an accelerator 400 may be connected to a bar 40 that operates a throttle 402 through a spring 403. The throttle movement is limited by a stop 404 and the bar 401 is connected to a control rod 405 which is connected to the gear changing lever, e. g., 388 or 301. Over the first part of the pedal movement the throttle is varied whilst over the last part of the pedal movement the throttle remains fully open whilst gear changing is effected.

Figure 8:
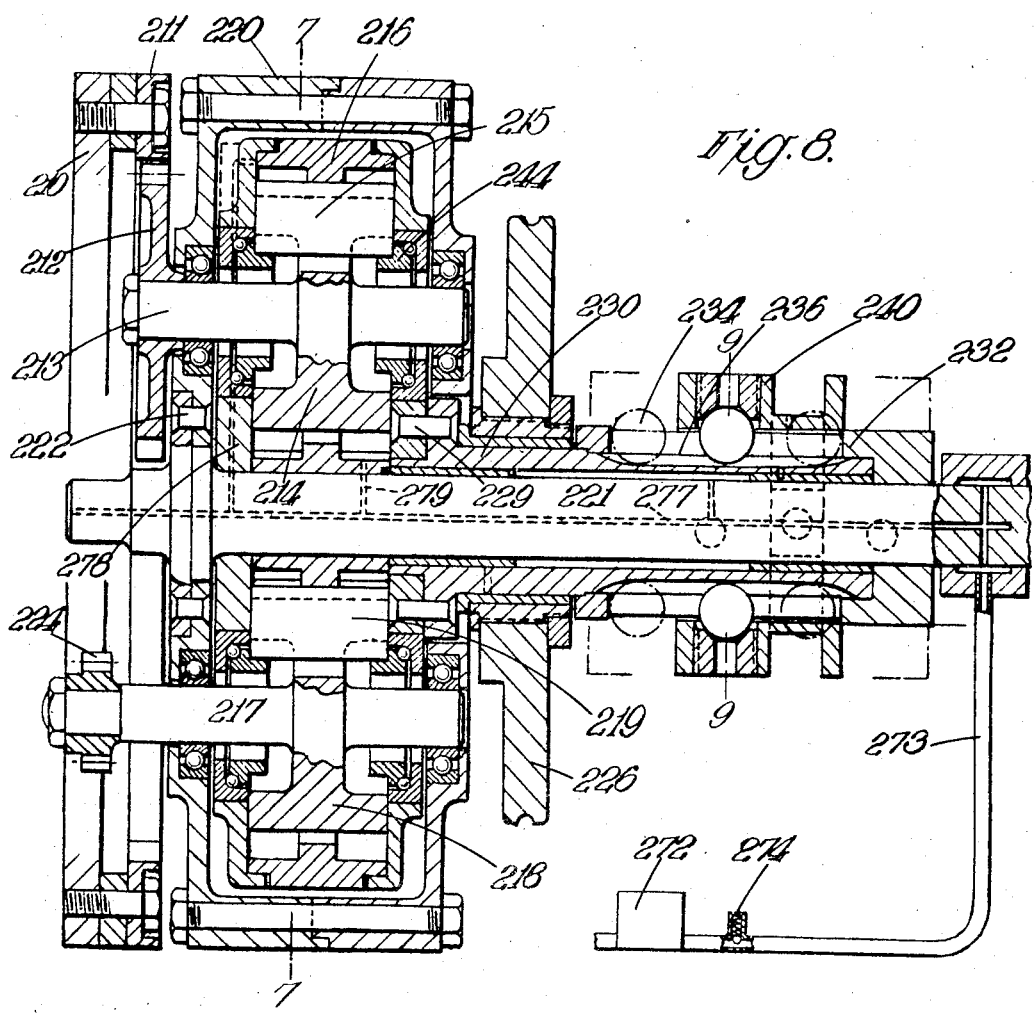
Figure 8 is a longitudinal vertical sectional view of the fluid type distributor, the upper part of the section being taken on the line X on Figure 7 and the lower part on the line Y.
Figure 20:
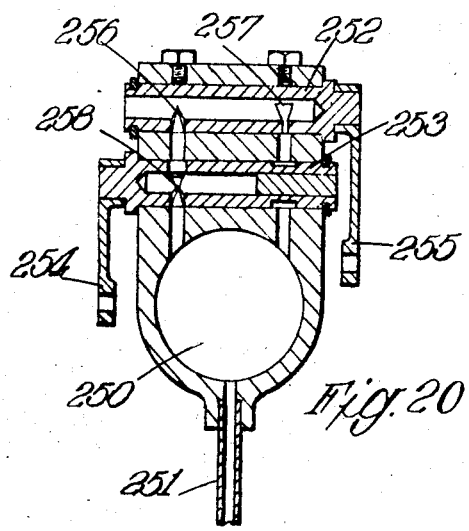
Figure 20 is a sectional view on line 21—21 on Figure 21 of a fluid actual control mechanism.
Figure 21:
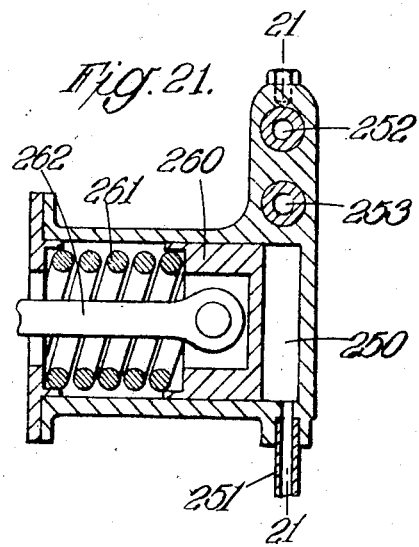
Figure 21 is a central sectional view of the mechanism shown in Figure 20.

Figure 23 shows a combined form of the apparatus shown in Figures 8, 21 and 22. The input shaft 221 drives the distributor 220 etc. which has the two output shafts C, D, that are connected to shafts C, D, of Figure 5 which has an output shaft 160 shown diagrammatically at the input end of the gear in Figure 23. In Figure 23 sliding collar 240 of Figure 8 is engaged by a yoke 450 that is carried by a bar 451 slidable in bearings 452, 453. The yoke is attached to a connecting rod 454 that is actuated by a crank 455 which is fixed to a spindle 456 that carries a pinion 457 in mesh with a gear segment 458. The gear segment 458 is carried on a radius arm 465 that is fixed on the spindle 459 of a rotary valve 460 that has fluid outlet ports 461, 462, 463, leading to the clutches of the gearbox shown in Figure 5. The bar 262 of Figure 21 is attached at 466 to the radius arm 465. The arm 254 is connected by the rod 405 of Figure 22 to accelerator pedal 400. The arm 255 is drawn by a spring 472 towards the right in the figure. A weighted arm or governor 473 carried on the output shaft 160 has a short arm 474 that presses against a collar 475 which is connected by a rod 476 to the arm 255 whereby the latter is moved according to the speed of the shaft 221 towards the left in the figure against the action of the spring 472. Oil under pressure is supplied to the pipe 251 from the pump 272 having an intake 480 and driven from the input shaft 221 through shaft 481, and gear wheels 482, 483.

I claim:

1. A power transmission apparatus comprising an input shaft, an output shaft, two intermediate members, at least two gear trains giving different ratios, means for coupling said gear trains simultaneously one to each of said intermediate members, means for coupling said two gear trains simultaneously to one of said shafts, a differential gear, means for coupling the intermediate members simultaneously through said differential gear to the said other shaft, and means to couple each of said members separately to the said other shaft when not coupled through the differential gear to said other shaft.

2. A power transmission apparatus comprising an input shaft, an output shaft, two intermediate members, at least two gear trains giving different ratios, means for coupling said gear trains simultaneously one to each of said intermediate members, means for coupling said two gear trains simultaneously to one of said shafts, a differential gear coupling said members together, and at least three clutches adapted to couple the other shaft at one time with one of said members and at another time with another of said members and at still another time to said differential gear whereby both members transmit power simultaneously.

3. A power transmission apparatus comprising an input shaft, an output shaft, two intermediate members, at least two gear trains giving different ratios, means for coupling said gear trains simultaneously one to each of said intermediate members, means for coupling said two gear trains simultaneously to one of said shafts, two differential gears adapted to distribute power to said two members according to three different ratios, and means for coupling the other shaft to both said members simultaneously through each of said differential gears at different times.

4. A power transmission apparatus comprising an input shaft, an output shaft, two intermediate members, at least two gear trains giving different ratios, means for coupling said gear trains simultaneously one to each of said intermediate members, means for coupling said two gear trains simultaneously to one of said shafts, a differential gear coupling said members together, at least three clutch members connected respectively to said two members and said differential gear, a cage carried by the other shaft, at least three clutch parts carried by said cage and adapted to clutch with said clutch members, and means for clutching said clutch parts to said clutch members at different times.

5. A power transmission apparatus comprising an input shaft, an output shaft, two intermediate members, at least two gear trains giving different ratios, means for coupling said gear trains simultaneously one to each of said intermediate members, means for coupling said two gear trains simultaneously to one of said shafts, a differential gear coupling said members together, at least three clutch members connected respectively to said two members and said differential gear, a cage carried by the other shaft, at least three clutch parts carried by said cage and adapted to clutch with said clutch members, a set of pistons for actuating said clutch parts, and means for supplying fluid under pressure to one side of each of said pistons for actuating said pistons.

6. A control apparatus associated with a throttle controlled engine and a power transmission apparatus and comprising a pressure chamber, a pressure responsive member movable according to the pressure in said chamber and connected to said transmission apparatus so that movement of this pressure responsive member varies the gear ratios of the transmission apparatus, means for supplying fluid to said chamber, a control member connected to the throttle so as to vary throttle opening towards full throttle over the first part of the travel of the control member and having a further travel, a valve actuated by connection to said control member and controlling leak of fluid from the pressure chamber so as to produce lower ratios as the throttle is opened over the first part of the travel of the control member and to produce higher ratios as the control member continues its movement over the second part of its travel, and another valve actuated according to gear output speed for controlling the leak from said chamber so as to vary transmission ratios in the sense of decreasing the ratios with increasing gear output speeds.

7. A power transmission apparatus comprising an input shaft, an output shaft, two intermediate members, at least two power transmitting connections giving different ratios and operatively disposed between said intermediate members and one of said shafts, means for coupling said connections simultaneously one to each of said intermediate members, means for coupling said two connections simultaneously to one of said shafts, power distributing means for coupling the other shaft to both said members simultaneously, whereby the power from the other shaft is divided between said members according to one ratio, and means for changing said last mentioned ratio to provide at least two other ratios of power supply to said members.

8. A power transmission apparatus comprising an input shaft, an output shaft, two intermediate members, at least two power transmission connections giving different ratios, means for coupling said connections simultaneously one to each of said intermediate members, means for coupling said two connections simultaneously to one of said shafts, means to connect the other shaft to one only of said members, means to connect the said other shaft to the other only of said members, power dividing mechanism adapted to divide power at different speeds between said members, and means to connect the said other shaft to both of said members simultaneously through said power dividing mechanism, whereby during one period of operation of the apparatus all the power can be passed through one of said intermediate members, while at another period of operation the power can be divided between the intermediate members which thereupon transmit power simultaneously, and at still another period of operation all the power can be passed through the other intermediate member.

9. A power transmission apparatus comprising an input shaft, an output shaft, two intermediate members, a gear mechanism comprising at least three transmission ratio systems, means for coupling the said intermediate members simultaneously and independently through two of the said systems to one of the said shafts and for uncoupling at least one of the said members from the said shaft and for coupling this member to the said shaft through the third system, the arrangement being such that said coupling and uncoupling is effected whilst power is transmitted through the apparatus by the other of the said members, and means for coupling the other shaft to said members simultaneously during certain periods of operation of the apparatus and for coupling said other shaft to one only of said members during another period and for coupling said other shaft to the other only of said members during still another period.

10. A power transmission apparatus comprising an input shaft, an output shaft, two intermediate members, a gear mechanism providing at least three power transmitting systems giving different ratios, means for coupling the said intermediate members simultaneously and independently through two of the said systems to one of the said shafts and for uncoupling at least one of the said members from the said shaft and for coupling this member to the said shaft through the third system, the arrangement being such that said uncoupling and coupling is effected whilst power is transmitted through the apparatus by the other of said members, means for coupling the other shaft to said members simultaneously and separately, and means for enabling the said uncoupling and coupling of one of said members to be effected only when said other shaft is coupled only to the other of said members.

11. A power transmission apparatus comprising an input shaft, an output shaft, two intermediate members, at least two power transmitting connections giving different ratios, means for coupling said connections simultaneously one to each of said intermediate members, means for coupling said two connections simultaneously to one of said shafts, a differential gear, means for coupling the intermediate members through said differential gear to the said other shaft, and means to couple each of said members separately to the said shaft when not coupled through the differential gear to said other shaft.

12. A power transmission apparatus comprising an input shaft, an output shaft, two intermediate members, a gear mechanism providing at least three power transmitting systems giving different ratios, means for coupling the said intermediate members simultaneously and independently through two of the said systems to one of the said shafts and for uncoupling at least one of the said members from the said shaft and for coupling this member to the said shaft through the third system, a differential gear, and means for coupling the other shaft to said members simultaneously through said differential gear.

13. A power transmission apparatus comprising an input shaft, an output shaft, two intermediate members, at least two power transmitting connections giving different ratios, means for coupling said connections simultaneously one to each of said intermediate members, means for coupling said two connections simultaneously to one of said shafts, a differential gear coupling said members together, and at least three clutches adapted to couple the other shaft at one time with one of said members and at another time with another of said members and at still another time to said differential gear whereby both members transmit power simultaneously.

14. A power transmission apparatus comprising an input shaft, an output shaft, two intermediate members, at least two power transmitting connections giving different ratios, means for coupling said connections simultaneously one to each of said intermediate members, means for coupling said two connections simultaneously to one of said shafts, a double differential gear to distribute power to said two members according to two different ratios, and means for coupling the other shaft to both said members simultaneously through the said differential gear so as to give the different ratios at different times.

15. A power transmission apparatus comprising an input shaft, an output shaft, two intermediate members, at least two power transmitting connections giving different ratios, means for coupling said connections simultaneously one to each of said intermediate members, means for coupling said two connections simultaneously to one of said shafts, a differential gear coupling said members together, at least three clutch members connected respectively to said two members and said differential gear, a cage carried by the other shaft, at least three clutch parts carried by said cage and adapted to clutch with said clutch members, and means for clutching said clutch parts to said clutch members at different times.

16. A power transmission apparatus comprising an input shaft, an output shaft, two intermediate members, at least two power transmitting connections giving different ratios, means for coupling said connections simultaneously one to each of said intermediate members, means for coupling said two connections simultaneously to one of said shafts, a differential gear coupling said members together, at least three clutch members connected respectively to said two members and said differential gear, a cage carried by the other shaft, at least three clutch parts carried by said cage and adapted to clutch with said clutch members, a set of pistons for actuating said clutch parts, and means for supplying fluid under pressure to one side of each of said pistons for actuating said pistons.

17. A power transmission apparatus comprising an input shaft, an output shaft, a layshaft gear box having a gear mechanism providing at least three power transmitting systems giving different ratios and four shafts comprising one of said input and output shafts a layshaft and two intermediate members, means for coupling and uncoupling gears in the layshaft gear box to and from their shafts for changing gear, means for coupling the said intermediate members simultaneously and independently through two of the said systems to one of the said shafts and for uncoupling at least one of the said members from the said shaft and for coupling this member to the said shaft through the third system, the arrangement being such that said coupling and uncoupling is effected whilst power is transmitted through the apparatus by the other of said members, and means for coupling the other shaft to said members simultaneously and separately.

18. A power transmission apparatus comprising an input shaft, an output shaft, two intermediate members, a gear mechanism providing at least three power transmitting systems giving different ratios, means for coupling the said intermediate members simultaneously and independently through two of the said systems to one of the said shafts and for uncoupling at least one of the said members from the said shaft and for coupling this member to the said shaft through the third system, said coupling and uncoupling means including clutch parts and pistons slidably mounted on the appropriate shafts coaxially with the wheels of the gear and keyed thereto and adapted to be pressed into engagement with said clutch parts thereby coupling the wheels to the shafts, the arrangement being such that said coupling and uncoupling is effected whilst power is transmitted through the apparatus by the other of said members, and means for coupling the other shaft to said members simultaneously and separately.

19. A power transmission apparatus comprising an input shaft, an output shaft, two intermediate members, at least two power transmitting connections giving different ratios, means for coupling the said intermediate members simultaneously and independently through two of the said connections to one of the said shafts, and an infinitely variable gear coupling said intermediate members to each other and adapted to vary the ratio of power transmitted by said members, whilst the sum of the torques on the two intermediate members remains at all times substantially equal to the torque on said other shaft.

20. A power transmission apparatus comprising an input shaft, an output shaft, two intermediate members, a gear mechanism providing at least three power transmitting systems giving different ratios, means for coupling the said intermediate members simultaneously and independently through two of the said systems to one of the said shafts and for uncoupling at least one of the said members from the said shaft and for coupling this member to the said shaft through the third system, and means comprising an infinitely variable gear coupled to said members and adapted to vary the ratio of power transmitted by said members including a state of freedom from positive transmission of power by one at least of said members when gear change of said systems is effected.

21. A power transmission apparatus comprising an input shaft, an output shaft, two intermediate members, a gear mechanism providing at least three power transmitting systems, giving different ratios, means for coupling the said intermediate members simultaneously and independently through two of the said systems to one of the said shafts and for uncoupling at least one of the said members from the said shaft and for coupling this member to the said shaft through the third systems, the arrangement being such that said coupling and uncoupling is effected whilst power is transmitted through the apparatus by the other of said members, means for coupling the other shaft to said members simultaneously and separately, and fluid actuated means including a valve device adapted to actuate all said coupling means.

22. A power transmission apparatus comprising an input shaft, an output shaft, two intermediate members, a planetary type gear having at least two power transmitting connections of different ratios controllable by clutching and declutching a series of rotatable parts, means for coupling the said intermediate members simultaneously and independently through two of the said connections to one of the said shafts, power distributing means for coupling the other shaft to both said members simultaneously whereby the power from the other shaft is divided between said members according to one ratio, and means for changing said ratio to provide at least two other ratios of power supply to said members.

23. A power transmission apparatus comprising an input shaft, an output shaft, two intermediate members, a gear mechanism providing at least three power transmitting systems giving different ratios, means for coupling the said intermediate members simultaneously and independently through two of the said systems to one of the said shafts and for uncoupling at least one of the said members from the said shaft and for coupling this member to the same shaft through the third system, a power dividing mechanism adapted to divide power between said members at different ratios, and means for coupling the other shaft to said members simultaneously through said power dividing mechanism.

24. A power transmission apparatus comprising an input shaft, an output shaft, two intermediate members, at least two power transmitting connections giving different ratios, means for coupling said connections simultaneously one to each of said intermediate members, means for coupling said two connections simultaneously to one of said shafts, power dividing means adapted to divide the power between the intermediate members, connecting means which connect the other of said shafts to both of said intermediate members simultaneously through said power dividing means during one period of operation of the apparatus and which connect said other shaft to one only of said intermediate members at another period of operation and which connect said other shaft to the other of said intermediate members during still another period of operation, and centrifugally acting means which control the operation of said connecting means.

HOWARD FREDERICK HOBBS.